United States Patent [19]

Martinez et al.

[11] Patent Number: 4,905,377
[45] Date of Patent: Mar. 6, 1990

[54] TRAVELER'S DIRECTION FINDER

[76] Inventors: Gregorio Martinez; Angel Garcia, both of 24-47 24th St., Astoria, N.Y. 11102

[21] Appl. No.: 298,935

[22] Filed: Jan. 23, 1989

[51] Int. Cl.⁴ .............................................. G01C 17/08
[52] U.S. Cl. ..................................... 33/333; 33/364; 33/354
[58] Field of Search ................. 33/352, 364, 272, 300, 33/273, 274, 354, 333, 334

[56] References Cited

U.S. PATENT DOCUMENTS

| | | | |
|---|---|---|---|
| 336,883 | 3/1886 | Adler | 33/333 |
| 830,769 | 9/1906 | Chandler | 33/273 |
| 897,794 | 9/1908 | Smith | 33/272 |
| 2,111,829 | 3/1938 | Winterer et al. | 33/272 |
| 2,618,856 | 11/1952 | Sweet | 33/354 |
| 2,822,618 | 2/1958 | Wendel | 33/352 |
| 3,068,583 | 12/1962 | Goshen | 33/364 |
| 3,373,429 | 3/1968 | Anderson | 33/274 |
| 3,646,681 | 3/1972 | Koenig | 33/274 |
| 3,858,326 | 1/1975 | Hurd | 33/273 |
| 4,236,313 | 12/1980 | Griffin, Jr. | 33/274 |

FOREIGN PATENT DOCUMENTS 0613832  10/1979  Switzerland .......................... 33/354

*Primary Examiner*—William A. Cuchlinski, Jr.
*Assistant Examiner*—Thomas B. Will
*Attorney, Agent, or Firm*—Nicholas J. Garofalo

[57] ABSTRACT

A unit comprising a base on which is mounted an atlas of maps each with an arrow thereon indicating the relation of the map area to north, and on which base is also mounted a compass having in a container a liquid on which floats a magnet bearing disk on the surface of which disk is a visible pointer pointing in the direction of the magnet's north pole and the earth's magnetic pole. A ball of non-permanent magnetic material centered on a cover of the container cooperates with the magnet in maintaining the floating disk centered in the container and spaced below the ball. In use, the unit is turnable by the traveler until the arrow on the map points in the same direction as the pointer on the disk, thereby apprising the traveler as to his position relative to his surroundings.

3 Claims, 1 Drawing Sheet

TRAVELER'S DIRECTION FINDER

BACKGROUND OF THE INVENTION

This invention in general is concerned with means for readily orienting the individual traveler as to the direction in which he desires to travel. More particularly, it is concerned with the combination of a compass and a map as a unit from which the traveler may readily ascertain his position relative to his surroundings and may then move onward without divergence toward his intended destination.

When traveling to areas beyond one's customary surroundings, the individual often finds himself to be lost, that is, he is unable to determine whether he is traveling north, south, east or west. He may then look to a map that he may be carrying, but may find that to be of no help. While the map has the conventional north pointing arrow on it, yet the individual may still be unable to determine where north is with respect to his surroundings. He may then resort to undesirable questioning of strangers for directions. Such is not recommended because of the dangers often associated with strangers, and because very often the answers of strangers, though well intended, are erroneous or misleading. Often a result of asking others for directions leads the traveler further astray from his intended destination.

Accordingly, an object of this invention is to provide a unit which will enable the traveler himself to readily determine the route leading to his intended destination.

A more particular object of the invention is to provide as a unit a compass in combination with an atlas which may be conveniently read, whether the unit is held on a level plane or at an angle.

Another object of this invention is to provide a map and compass combination as a unit whereby the traveler may readily determine his position and the shortest route to his intended destination.

A further object of the invention is to provide a compass in combination with an atlas of maps whereby each map of the atlas may be read relative to the compass, and thereby one's direction of travel may be readily determined.

The foregoing objects as well as other aspects of the invention will become apparent as this specification continues in further detail.

BRIEF SUMMARY OF THE INVENTION

In accordance with the invention there is provided for the convenience of the traveler a unit enabling him to readily determine his position relative to his surroundings and the direction in which to travel to reach his destination. The unit may be handheld when in use. It comprises in combination an atlas of maps and a compass, both mounted upon a common support. The maps cover the area to which the traveler wishes to go; and the compass is employed to orient the conventional north indicating arrow on the map with the north magnetic pole of the compass. This will enable the traveler to become aware of his position relative to his surroundings and of the direction in which he is to proceed to reach his destination. This orientation is accomplished by turning the unit until the north indicating arrow on the map is parallel to and points in the same direction as the north indicating pole of the compass, if it is not already so oriented.

In use, the unit may be held on a level plane or at an angle. To enable this a permanent magnet element of the compass is adhered to a disk or float floating in a liquid and the disk has on its surface a pointer pointing to the north magnetic pole of the compass. Accordingly, whether the unit is held on a level plane or at an angle, the floating disk remains on a level plane with the pointer thereon indicating the north magnetic pole of the compass.

The disk carrying the magnet floats in a container. To maintain the floating disk continually centered in the container and clear of the surrounding wall of the container, a non-permanent magnetic ball is seated centrally of a cover of the container. The magnetic influence between the permanent magnet and the ball is such that the ball and disk remain at all times spaced from one another, and the disk remains centered in the container clear of the cover and the surrounding wall of the container.

DETAILED DESCRIPTION OF THE INVENTION

Figure 1:
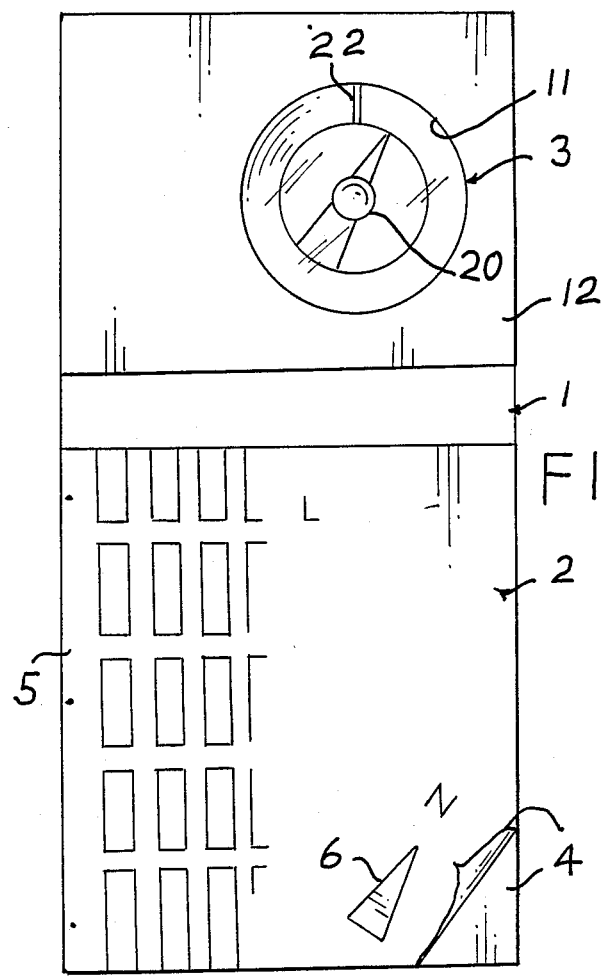
FIG. 1 is a top plan view of a unit embodying the invention and showing both a compass instrument and an atlas of maps mounted upon a common support.

The unit embodying the invention, as illustrated in the accompanying drawing, includes a support 1, here in the form of a firm panel or base, upon which is mounted an atlas 2 of maps and a magnetic compass instrument 3. The unit defines an apparatus adapted to be conveniently handheld when in use.

The atlas, which is fixed upon the support, comprises in book form a multiple number of maps 4, each hinged to the other in the manner of a page along a longitudinal edge 5 thereof. The atlas is intended primarily for the traveler and sightseer. The various maps comprising the atlas are conventional. They show the streets of the various areas and communities, and also have indicated thereon transportation facilities, recreation centers, hospitals and the various points of interest likely to be visited by the traveler or sightseer. On each map is printed the conventional north indicating arrow 6 with the letter N at its tip.

The compass instrument 3 includes a container 7, the top of which is closed by a cover 8. The container preferably has an annular cuplike body 9, and it is seated in a complementary opening or pocket 11 provided in a platform 12 mounted upon a forward area of the support 1. The top of the container projects above the surface of the platform sufficiently to enable the container to be finger gripped and adjustably positioned when such may be required in the use of the apparatus, as hereinafter further described. The support 1 and platform 12 are of non-magnetic material.

The container 7 including its cover is formed of non-magnetic material, such as transparent plastic which allows the traveler to have a clear view of the contents of the container. The container is partially filled with a liquid 13 of a nature which is not readily subject to freezing, such as alcohol.

Figure 2:
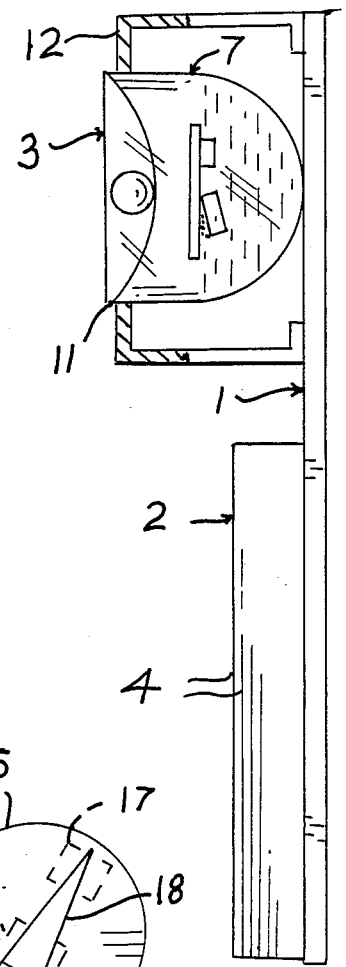
FIG. 2 is an elevational view of FIG. 1 from its right side, the upper portion of the platform in which the compass instrument is seated being broken away.
Figure 3:
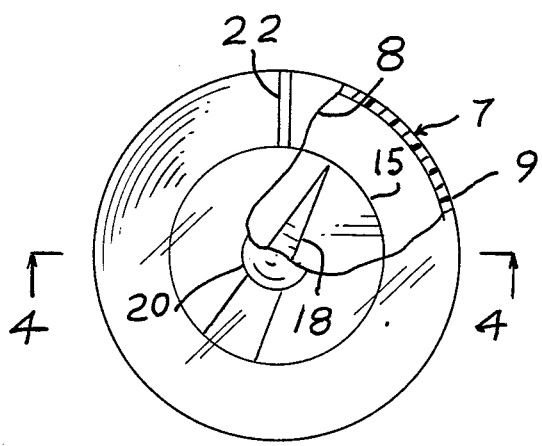
FIG. 3 is an enlarged top plan view of the compass instrument apart from the support.
Figure 5:
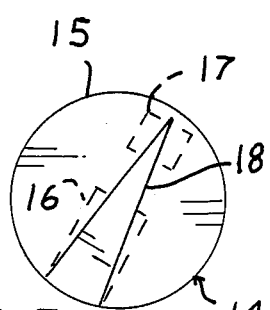
FIG. 5 is an enlarged plan view of the float apart from the container.

Floating in the liquid is a float 14. It comprises a circular plate or disk 15 of non-magnetic material having a permanent magnet 16 fixed, as by cement, preferably to the underside of the disk. Here, the magnet is of bar form. The magnet is inclined relative to the disk at a slight angle, preferably at about 30° from horizontal. The magnet is positioned along a radius of the disk, and in such manner that a pole end of the magnet is preferably disposed at about the center of the disk. To avoid the float becoming overweighted to one side and dipping at an angle because of the position of the magnet, a counterbalancing weight 17 of non-magnetic material is positioned on an opposite radius of the disk whereby the float obtains and floats on a level plane. The overall weight of the float is such as to cause it to depend in the liquid to a degree at which its top surface protrudes to a small extent above the liquid, as best appears in FIG. 2.

The north seeking pole of the magnet will continuously act to cause the float and magnet adhered thereto to turn as a unit, as when the magnet acts to align itself with the earth's north magnetic pole. In this respect, the pull of the earth's north magnetic pole will tug the north seeking pole of the magnet, commonly called the north pole of the magnet, to point to the north. A pointer 18 printed or fixed upon the top surface of the float in parallel relation to the magnet and aligned with the north pole of the magnet, serves to indicate the north direction to which the magnet points.

Figure 4:
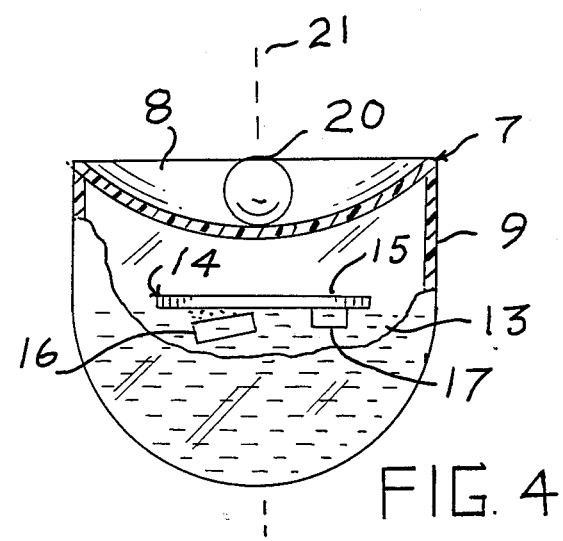
FIG. 4 is a partial section on line 4—4 of FIG. 3.

So as to allow the float to freely rock in the liquid should there be any disturbing movement of the apparatus, the container is only partially filled with the liquid to provide a space, as appears in FIG. 4, between the liquid and the underside of the cover 8 of the container. Further, the float is circular and of a diameter relatively smaller than the inner diameter of the container, and means is provided to maintain the float centered in the container and clear of the surrounding wall of the container. This means is a non-permanent magnetic element, here in the form of a ball 20.

The ball is of soft iron material. It is seated and fixed by cement centrally atop the cover of the container, preferably in a depressed area of the surface of the cover. The cover, as shown in FIG. 4, is preferably concaved to accomodate the ball at its center. The float has, by virtue of the central position of the ball on the cover and the slight influence of the ball upon the magnet 16, a position continually centered in the container and clear of the surrounding wall of the container. In this arrangement, an imaginary common vertical axis 21 passes through the ball and the float, not only when the container is at rest but also when the container is tilted at an angle or when the float is rocking due to mild movements of the liquid in which it floats. This common axis remains vertical at all times. The space between the float and the cover and the clearance between the float and the surrounding wall of the container permit some angular tilting of the container and consequent rocking movement of the float without the float striking the wall areas of the container.

The float and ball continually obtain this axially aligned condition due to the forces of the magnet acting upon the soft iron ball. The pull or strength of the magnet relative to the ball is such as to maintain the float centered relative to the ball at all times, but is not strong enough to cause the magnet with the float to be drawn into holding contact with the container's cover at the underside of the ball. Nor will the force of the magnet keep the float in holding contact with the container's cover at the underside of the ball if the float should come into such contact. Accordingly, a desired resulting separation or spacing is maintained at all times between the ball and the float without affecting the axially aligned condition of the float and the ball.

It is about this common axis that the float and magnet as a unit revolves relative to the ball accordingly as the magnet turns in seeking the earth's north magnetic pole. This imaginary axis in effect replaces the usual pivot pin of the conventional compass, and allows for a desirable spacing of the float from the surrounding wall and cover of the container.

Fixed upon the outer surface of the container's cover is a further pointer or marker, here in the form of a radial line 22, preferably colored. In the use of the apparatus it is intended that the container will be manually turned until this radial line becomes positioned, if it is not already so, parallel to the north pointing arrow 6 printed on the particular map 4 being used. The container, as earlier stated, projects a short distance out of its pocket so as to enable the container to be manually gripped and adjustably turned about its axis as may be needed to orient the radial line 22 on its cover with the north indicating arrow 6 on the map.

When the traveler is in a particular community and has before him a map 4 of the atlas covering that area but he is at a loss as to the direction in which he is traveling, he will make use of the apparatus as follows: With the map in question before him, he will manually turn the container about in its pocket until the radial line 22 on the container is brought into parallel alignment with the north indicating arrow 6 on the map, if it is not already so aligned. He will then turn the apparatus about its axis until the aligned pointers 22 and 6, respectively on the container and map, are in parallel alignment with and point in the same direction as the pointer 18 on the float 14 of the compass instrument. He will then become aware as to the actual north end of the community in which he is located; and, accordingly, he can establish his intended direction of travel. The colored radial line 22, when so aligned, serves to provide an external readily visible guide to the traveler.

A further advantage to be noted in the use of the apparatus is that it may be held on a level plane or at an angle when being used, since the float 14 maintains a level condition in the container at all times.

While an embodiment of the invention has been illustrated and described in detail, it is to be expressly understood that the invention is not limited thereto. Various changes of form, design or arrangement may be made in its components without departing from the spirit and scope of the invention. It is our intent, therefore, to claim the invention not only as shown and described but also in all such forms and modifications or equivalents thereof as might be construed to be within the spirit of the invention when considered in the light of the specification, the drawing and the appended claims.

What is claimed is:

1. A traveler's direction finder comprising an atlas of maps, each map of which has an arrow on its face indicating the area of the map relative to the magnetic north; a compass instrument comprising a container, a liquid partially filling the container, a float floating in the liquid, a single permanent magnet element fixed on the float, an indicator on the float indicating the magnetic north to which the north pole of the permanent magnet points, and a transparent cover closing over a top end of the container through which cover the indicator is visible to the traveler, a ball of soft iron material fixed centrally of the top of the cover, the ball and magnet interacting with one another whereby the float is maintained floating centrally of the container and spaced below the ball; and a supporting panel upon which both the atlas of maps and the compass instrument are mounted, the supporting panel being adapted to be manually held and turned about the vertical axis of the panel to bring the arrow on a selected map of the atlas in the same indicating direction as the indicator on the float.

2. A traveler's direction finder as in claim 1 wherein an externally visible radial line is on the cover of the container, the container has an annular body and is seated in a complementary pocket in the supporting panel, the container is adapted to be manually turned in the pocket to bring the radial line on its cover into parallel alignment with the arrow on the map, and the supporting panel is manually turnable about its vertical axis to bring the aligned arrow and radial line into parallel relation with the indicator on the float.

3. A traveler's direction finder comprising a supporting panel adapted to be handheld, an atlas of maps mounted on the panel, the atlas comprising a multiple number of maps each hinged to the other in the manner of the pages of a book along a longitudinal edge thereof, each map having marked thereon a north indicating arrow with the letter N at its tip, a platform mounted on the panel forwardly of the atlas, a compass instrument including a container having an annular body seated in a complementary pocket provided in the platform, the container projecting at its upper end above the platform sufficiently to enable it to be manually gripped for turning of the container about its vertical axis relative to the pocket, a liquid partially filling the container, a disk of non-magnetic material floating in the liquid and having a single permanent magnet of bar form adhered to its undersurface along a radius of the disk, a pointer extending radially on the upper surface of the disk in parallel relation to the magnet and pointing in the same direction as the north pole of the magnet, a transparent cover spaced above the disk and closing over a top end of the container and through which cover the pointer is visible to the traveler, a ball of soft iron material fixed centrally of the top of the cover, the ball and magnet interacting with one another whereby the disk is maintained floating centrally of the container and spaced below the ball, a radially extending colored line marked on the top of the cover, the container being subject to manual turning about its vertical axis in the pocket of the platform to bring the colored line into parallel alignment with the arrow of a selected map of the atlas, and the supporting panel being subject to manual turning about its vertical axis to bring the aligned colored line and the arrow into parallel alignment with and pointing in the same direction as the pointer on the disk.

* * * * *